United States Patent
Eisenhour (12)

(10) Patent No.: US 6,272,871 B1
(45) Date of Patent: Aug. 14, 2001

(54) AIR CONDITIONER WITH ENERGY RECOVERY DEVICE

(75) Inventor: Ronald Snowden Eisenhour, West Bloomfield, MI (US)

(73) Assignee: Nissan Technical Center North America, Farmington Hills, MI (US)

( * ) Notice: Subject to any disclaimer, the term of this patent is extended or adjusted under 35 U.S.C. 154(b) by 0 days.

(21) Appl. No.: 09/537,572

(22) Filed: Mar. 30, 2000

(51) Int. Cl.[7] .................................................. F25D 9/00
(52) U.S. Cl. ................... 62/225; 62/87; 62/116; 62/402
(58) Field of Search .................. 62/86, 87, 88, 62/402, 403, 116, 225, 222, 223, 224, 204, 210, 211, 212, 172

(56) References Cited

U.S. PATENT DOCUMENTS

| | | |
|---|---|---|
| 3,153,916 | 10/1964 | Schuhmacher .......................... 62/402 |
| 3,321,930 | 5/1967 | La Fleur ................................ 62/87 X |
| 3,934,424 | 1/1976 | Goldsberry ........................... 62/402 X |
| 5,875,643 | 3/1999 | Kanai ...................................... 62/279 |

FOREIGN PATENT DOCUMENTS

| | | |
|---|---|---|
| 61-96370 | 5/1986 | (JP) . |
| 4-340062 | 11/1992 | (JP) . |
| 11-63707 | 3/1999 | (JP) . |

*Primary Examiner*—Harry B. Tanner
(74) *Attorney, Agent, or Firm*—Foley & Lardner

(57) ABSTRACT

An air conditioner has an evaporator, a main compressor, a condenser, and an energy recovery device. The condenser receives a compressed refrigerant from the compressor and condenses the refrigerant to either a liquid phase or a saturated liquid-vapor phase (reduced refrigerant charge content). The condensed refrigerant is passed through the energy recovery device to expand the refrigerant. The refrigerant passing through the energy recovery device is regulated to maintain the refrigerant in a high cavitation region within the motor, while maintaining within a predetermined refrigerant pressure range in the motor. The condensed and compressed refrigerant is expanded, in the motor, to a saturated liquid-vapor phase having a higher vapor content before the refrigerant exits the motor to optimize energy recovery.

27 Claims, 8 Drawing Sheets

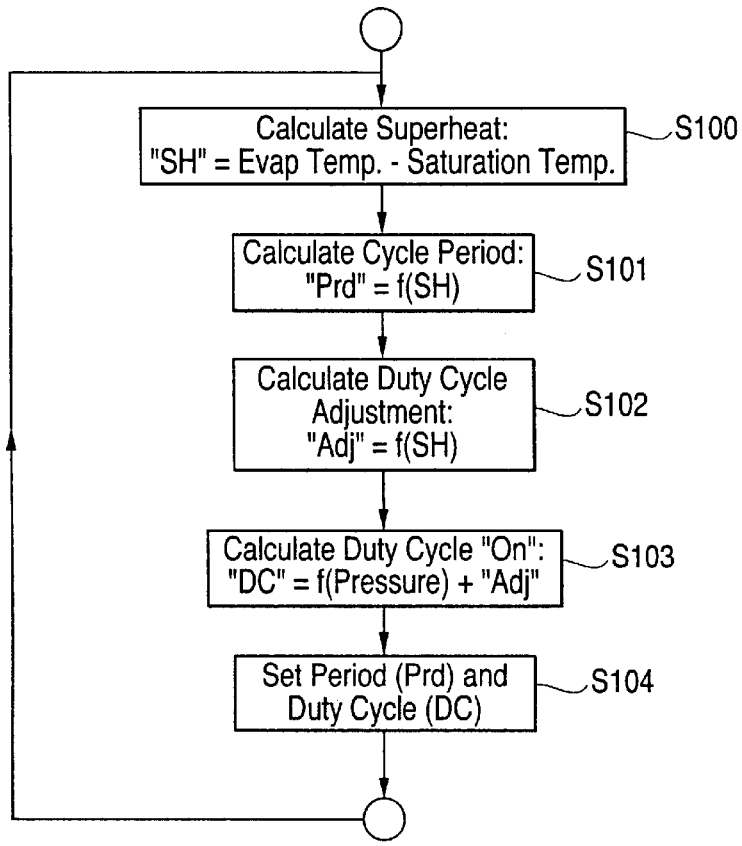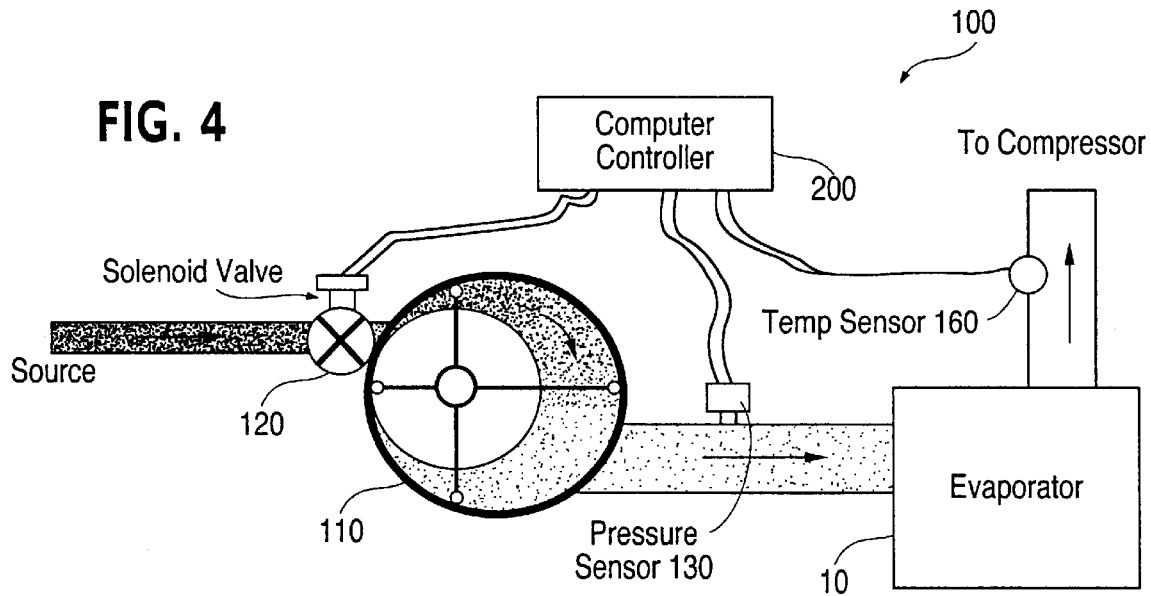

AIR CONDITIONER WITH ENERGY RECOVERY DEVICE

BACKGROUND

A typical automobile air conditioner includes a compressor, a condenser, an expansion valve, and an evaporator. The compressor compresses a cool vapor-phase refrigerant (e.g., freon, R134a) to heat the same, resulting in a hot, high-pressure vapor-phase refrigerant This hot vapor-phase refrigerant runs through a condenser, typically a coil that dissipates heat. The condenser condenses the hot vapor-phase refrigerant into liquid refrigerant. The liquid refrigerant is throttled through the expansion valve, which evaporates the refrigerant to a cold, low-pressure saturated liquid-vapor-phase refrigerant. This cold saturated liquid-vapor-phase refrigerant runs through the evaporator, typically a coil that absorbs heat from the air fed to the passenger compartment.

An automobile air conditioner consumes much engine power, which negatively impacts the acceleration performance and fuel economy. Attempts have been made to improve the air conditioner's efficiency by capturing some of the energy released by the hot, high-pressure refrigerant during the expansion stage, and applying the recovered energy toward compressing the cool vapor-phase refrigerant.

When a high-pressure, liquid refrigerant is throttled through an expansion valve or an orifice, it is transformed into a cold low-pressure saturated liquid-vapor-phase refrigerant, which is known as a "refrigeration effect." The throttling process itself does not fundamentally change the enthalpy (energy) content of the liquid-phase refrigerant. The liquid-phase to saturated liquid-vapor phase transformation, however, creates a boiling effect that liberates much kinetic energy, lowering the temperature of the refrigerant. The refrigerant's pressure drop from the high side to the low side and its subsequent expansion during cavitation (liquid-phase to saturated liquid-vapor-phase) provides excellent opportunity to extract mechanical work. Further, extracting work from the refrigerant will enhance the refrigeration cycle performance, since the energy content of the refrigerant is reduced. It would be desirable to capture this kinetic energy as much as possible.

In this regard, Japanese Patent publication Nos. 11-063707, 4-340062, and 61-96370, for example, disclose substituting the expansion valve with an expansion machine to capture part of the kinetic energy liberated during the throttling process. The expansion machine is essentially a motor driven by the hot, high-pressure liquid-phase refrigerant as it evaporates to a cold, low-pressure saturated vapor-phase refrigerant. The motor in turn is connected to a supercharger or compressor that can partially compress all or some of the cool vapor-phase refrigerant exiting from the evaporator, upstream of the compressor. The compressed refrigerant is fed through the compressor or fed to the condenser. Ideally, this should reduce the energy required to compress the refrigerant, thus making the air conditioner more efficient.

The present inventor has discovered that work can be best captured when the refrigerant is undergoing transformation from a liquid phase (or saturated liquid-vapor phase) to a saturated liquid-vapor phase having a higher vapor content, which occurs in a "high cavitation" region. Keeping the refrigerant in a high cavitation region within the motor, however, is difficult. The present inventor has discovered a way of maintaining the location of the high-cavitation region as the refrigerant is passed through an energy recovery device.

SUMMARY

The present invention thus relates to an air conditioner or air conditioning system with an energy recovery device, and a method thereof. The air conditioner comprises an evaporator, a main compressor, a condenser, and an energy recovery device. The evaporator receives a cold refrigerant and evaporates the refrigerant. The main compressor is connected to the evaporator so that the compressor can receive the evaporated refrigerant from the evaporator and compress the refrigerant. The condenser is connected to the compressor so that the condenser can receive the compressed refrigerant from the compressor. The energy recovery device is connected to the condenser and the evaporator so that the compressed refrigerant is passed through the energy recovery device and directed into the evaporator.

According to one aspect of the invention, the energy recovery device includes a motor and a regulator. The motor is located downstream of the condenser and upstream of the evaporator. The regulator maintains the refrigerant in a high cavitation region, while maintaining within a predetermined refrigerant pressure range in the motor, and expands the compressed and condensed refrigerant to a first saturated liquid-vapor phase. The regulator releases the refrigerant to the evaporator in the first saturated liquid-vapor phase.

According to another aspect of the invention, a method of recovering energy from an air conditioner comprises flowing compressed refrigerant into the motor, detecting the pressure of the refrigerant downstream of the motor, and opening and closing the valve based on the detected pressure of the refrigerant downstream of the motor to regulate the refrigerant flowing into the motor and maintain the refrigerant in a high cavitation region, while maintaining within a predetermined refrigerant pressure range in the motor. This enables the refrigerant to expand to the first saturated liquid-vapor phase in the motor to optimize energy recovery.

According to another aspect of the invention, a method of recovering energy from an air conditioner comprises condensing a compressed refrigerant to a saturated liquid-vapor phase (instead of a liquid phase), passing the saturated liquid-vapor-phase refrigerant through an energy recovery device, which includes a motor, regulating the flow of the refrigerant through the motor and maintaining the refrigerant in a high cavitation region, while maintaining within a predetermined refrigerant pressure range in the motor, to expand, in the motor, the saturated liquid-vapor-phase refrigerant to the first saturated liquid-vapor phase, which has a higher vapor content than the refrigerant released from the condenser, to optimize energy recovery.

The regulator can comprise a valve and a controller. The valve can be located adjacent the motor, either immediately upstream or downstream of the motor. The valve opens and closes (modulates or pulsates) to regulate the flow of refrigerant through the motor. The controller controls the opening and closing of the valve based on the pressure of the refrigerant downstream of the motor and upstream of the evaporator to regulate the refrigerant flowing into the motor and maintain the refrigerant in the high cavitation region, while maintaining within the predetermined refrigerant pressure range in the motor. The refrigerant is expanded to the saturated liquid-vapor phase in the motor, before the refrigerant exits the motor, to optimize energy recovery.

The controller includes a pressure sensor or a pressure switch located downstream of the motor and upstream of the evaporator. In one embodiment, the valve is located immediately upstream of the motor. In this instance, the valve passes the compressed refrigerant when the valve is opened.

In another embodiment, the valve is located immediately downstream of the motor, and the energy recovery device further includes an orifice immediately upstream of the motor to limit the flow of liquid refrigerant, when the solenoid valve is open.

The controller can include a temperature sensor located immediately downstream of the evaporator. If a pressure switch is used, the controller can include a power relay to open and close the valve.

The energy recovery device can further include a booster compressor positioned either upstream or downstream of the main compressor, the motor being configured to drive the booster compressor to enhance efficiency. In another embodiment, the motor can be integrally built with the main compressor, the motor further driving the main compressor to aid in compressing the refrigerant. In another embodiment, the energy recovery device can further include a generator for charging a battery or driving a cooling fan. Alternatively, the motor can be adopted to drive a cooling fan.

The predetermined pressure range in the motor is preferably less than about 40 psig. In this respect, the valve can be controlled to close when the detected pressure reaches greater than 42 psig and to open when the detected pressure reaches less than 24 psig.

BRIEF DESCRIPTION OF THE DRAWINGS

These and other features, aspects, and advantages of the present invention will become more apparent from the following description, appended claims, and accompanying exemplary embodiments shown in the drawings, which are briefly described below.

FIG. 4 schematically shows yet another embodiment of the energy recovery device according to the present invention, while its solenoid valve is in the open state.

FIG. 14 is a flow chart illustrating yet another embodiment of the solenoid valve control logic.

DETAILED DESCRIPTION

Figure 1:
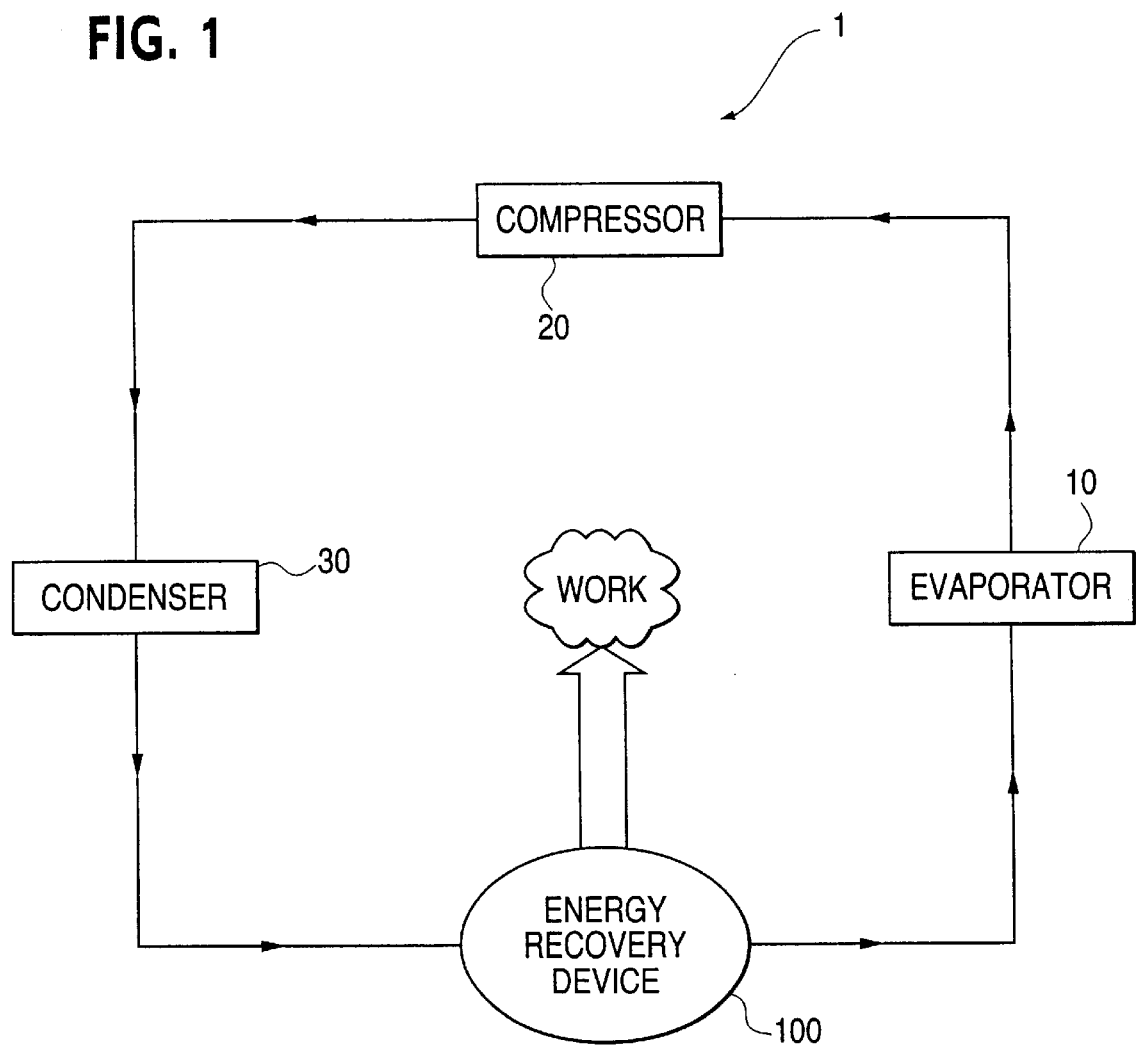
FIG. 1 schematically illustrates a refrigerant circuit of the present invention.

Referring to FIG. 1, an air conditioner 1 according to the present invention, which is particularly suitable for an automobile, includes an evaporator 10, a compressor 20, a condenser 30, and an energy recovery device 100. The compressor 20 is connected to the condenser 30 via a refrigerant pipe or duct. The evaporator 10 is also connected to the compressor 20 via a refrigerant pipe. The energy recovery device 100 is connected to the condenser 30 via a refrigerant pipe and to the evaporator 10 by a refrigerant pipe. The compressor 20 receives and compresses a cool vapor-phase refrigerant (e.g., freon, R134a) from the evaporator 10. The compression action heats the refrigerant, resulting in a hot, high-pressure vapor-phase refrigerant. This hot vapor-phase refrigerant runs through the condenser 30, such as an air-cooled coil that dissipates heat. The condenser 30 condenses the hot vapor-phase refrigerant into a liquid-phase refrigerant or a saturated liquid-vapor-phase refrigerant.

The condensed refrigerant is delivered (with very little pressure drop) to the energy recovery device 100, which expands the liquid-phase or saturated liquid-vapor-phase refrigerant to a cold, low-pressure liquid-vapor-phase refrigerant having a higher vapor content, and captures a portion of the kinetic energy released during the expansion process. The cold liquid-vapor-phase refrigerant (having a higher vapor content than the refrigerant exiting the condenser) runs through the evaporator, typically a coil that absorbs heat from and cools the air delivered to the passenger compartment.

The refrigerant undergoes three states during the transition from the high side to the low side: liquid or saturated liquid-vapor (having a lower vapor content), high cavitation, and saturated liquid-vapor (having a higher vapor content). In the liquid state (or saturated liquid-vapor phase having a high liquid content), the refrigerant mimics hydraulic behavior (low volumetric flow rate in a single phase). In the high-cavitation state, a small liquid volume expands to a large vapor volume. In the saturated liquid-vapor state having a higher vapor content, the refrigerant behaves like a gas (complete phase transition with a high volumetric flow rate). As mentioned earlier, the present inventor has discovered that work can be best derived while the refrigerant is in the high cavitation state. Attempts to extract energy from the other phases can effectively impede flow and yield very little net benefit.

Keeping the high-cavitation state (phase change region) located in a turbine/motor 110 is difficult. The present inventor has discovered that pulsing or modulating a valve, e.g., solenoid valve, with a low-pressure drop can directly influence the phase on either side of the valve. Closing the valve can maintain a liquid and vapor boundary located at the valve region.

FIGS. 2–7 show four embodiments of the energy recovery device 100 according to the present invention. In all four embodiments, the energy recovery device 100 can include a pneumatic turbine/motor 110 and a solenoid operated valve 120, and a pressure sensor 130 or switch 130' positioned downstream of the motor 110 and upstream of the evaporator 10. The solenoid valve 120 can be, for instance, Model No. RB3P2 manufactured by PARKER. The motor 110 can be, for instance, ¾ HP air motor Model No. 2AM-NCC-16, manufactured by GAST. This air motor provides a basic internal structure schematically illustrated in FIGS. 2–7.

This air motor, by design, does not seal exceptionally well internally or externally. Thus, to properly contain refrigerant, additional sealing is applied to the bearings and housing seams. The internal leakage (blow-by) compromises the efficiency of power recovery, in that some refrigerant will bypass the turbine. Due to this effect, this motor clearly cannot be useful in modulation of refrigerant flow and will act as an orifice when turbine rotation is stopped. As a critical countermeasure to the imperfection of the motor internal sealing, the solenoid valve 120, which safely maintains a high-pressure level (up to 350 psig) at the inlet of the motor, is used. The solenoid valve 120 is used to modulate the refrigerant flow and can maintain a pressure of around 40 psig at the outlet of the motor. This way, the blow-by effect advantageously does not disable the power recovery function, in contrast to prior known designs, since a large pressure drop across the motor is kept.

Figure 2:
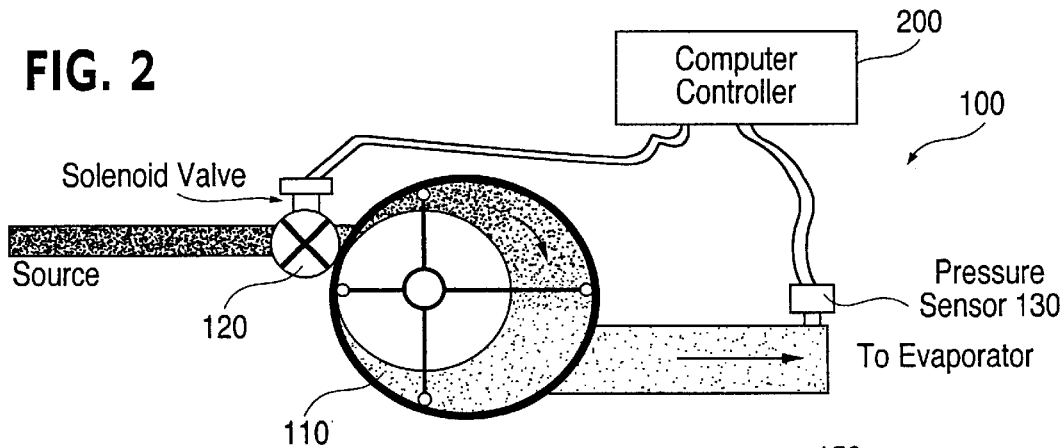
FIG. 2 schematically shows one embodiment of the energy recovery device according to the present invention, while its solenoid valve is in the open state.
Figure 3:
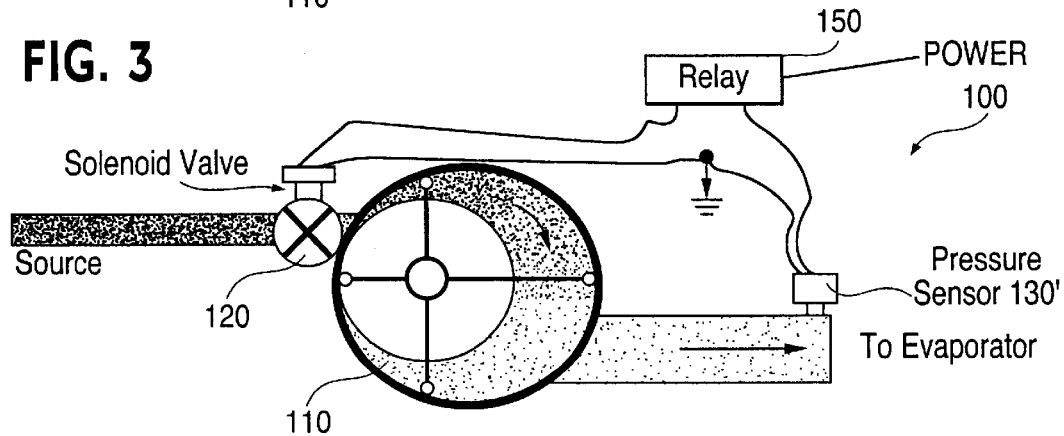
FIG. 3 schematically shows another embodiment of the energy recovery device according to the present invention, while its solenoid valve is in the open state.
Figure 6:
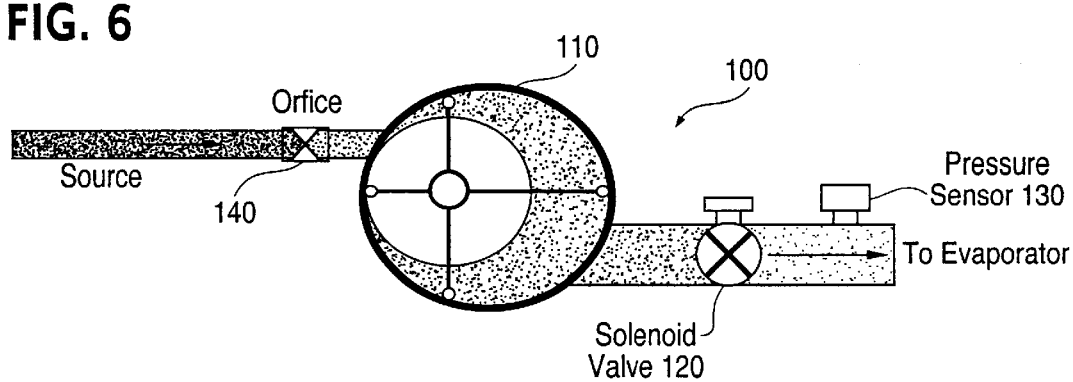
FIG. 6 schematically shows yet another embodiment of the energy recovery device according to the present invention, while its solenoid valve is in the open state.

The pressure sensor 130 or switch 130' can be used to control the opening and closing of the solenoid valve 120. In the embodiments of FIGS. 2 and 4, a computer controller 200 can be used with a pressure sensor 130 to control the solenoid valve 120. In the embodiment of FIG. 3, a power relay 150 and the pressure switch 130' can be used to control the opening and closing of the solenoid valve 120. In the embodiment of FIG. 6, either the power relay or the computer controller 200 can be used as in the embodiments of FIG. 3 or FIGS. 2 and 4. For instance, the solenoid valve 120 can be operated with a 24 VAC coil with a 12 VDC (or the voltage of the automobile) and a pressure switch 130', which can be a conventional pressure cycling switch available from VISTEON. In the embodiment of FIG. 4, an additional temperature sensor 160 can be included to take into consideration the evaporated refrigerant condition. The temperature sensor 160 monitors the temperature of the refrigerant exiting the evaporator 10.

Figure 7:
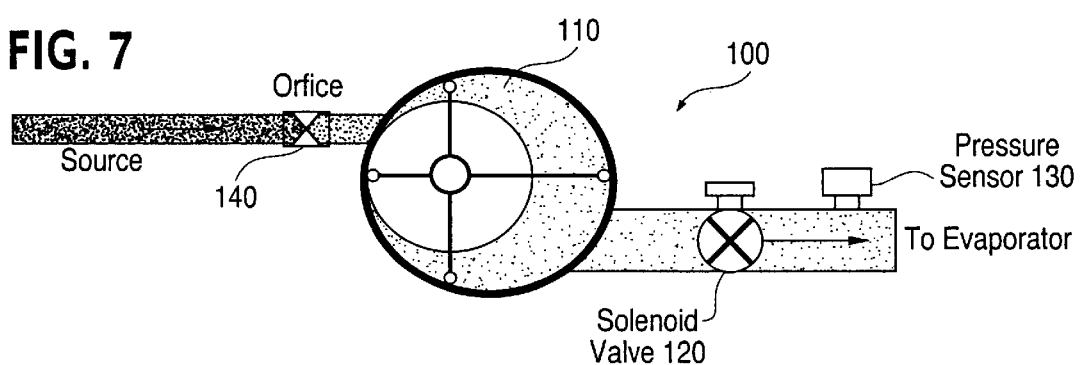
FIG. 7 schematically shows the energy recovery device of FIG. 6, while its solenoid valve is in the closed state.

In the embodiment of FIGS. 2–5, the solenoid valve 120 is positioned immediately upstream of the motor 110. The solenoid valve 120 acts as a shut-off valve rather than an expansion valve, due to a low-pressure drop when it is open. In the embodiment of FIGS. 6–7, the solenoid valve 120 is positioned immediately downstream of the motor, but upstream of the pressure sensor 130 or switch 130', and further includes a separate expansion valve or orifice 140 positioned immediately upstream of the motor 110.

The present embodiments thus present two approaches: upstream and downstream configurations. The upstream configuration, e.g., the embodiments of FIGS. 2–5, feeds liquid (or highly liquid) refrigerant to the motor. The motor is kept at a low pressure, e.g., <40 psig, when the solenoid valve 120 is closed. When the solenoid valve 120 is opened, liquid or saturated liquid-vapor-phase refrigerant (having a high liquid content) may flood into the motor 110 and begin cavitation within the motor 110. If the flooding continues, the phase transition will pass through the motor and hydraulic effects will dominate. The object is to avoid the hydraulic effects. The downstream configuration creates a high-pressure refrigerant within the motor. A source flow restriction is created to ensure that opening of the valve 120 will create cavitation within the motor 110. If the restriction is not applied, liquid will flood through the motor 110, creating the undesirable hydraulic effects.

The "refrigeration effect" must be maintained for the air conditioner to be effective. Therefore, the exit conditions from the motor 110 need to be maintained at pressures and refrigerant flow rates that will keep the evaporator cold. Thus, flow regulation by the solenoid valve 120 needs to be controlled based on the motor exit pressure, which correlates to the evaporator pressure. This motor exit pressure can be monitored with the pressure sensor 130 positioned downstream of the motor 110 and the solenoid valve 120. The pressure control device can be either a pressure sensor 130 or a simple pressure switch 130' to pulse modulate the solenoid valve 120. Additional performance information of evaporator refrigerant superheat can also be added to a control logic to facilitate better cool air delivery.

Figure 12:
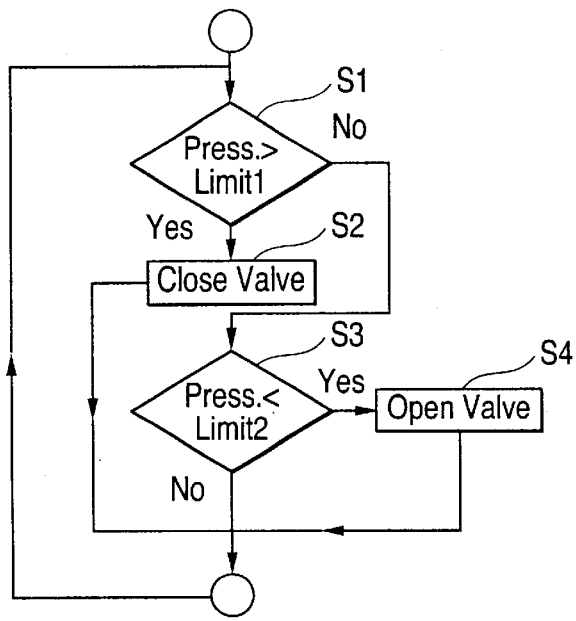
FIG. 12 is a flow chart illustrating an embodiment of the solenoid valve control logic.
Figure 13:
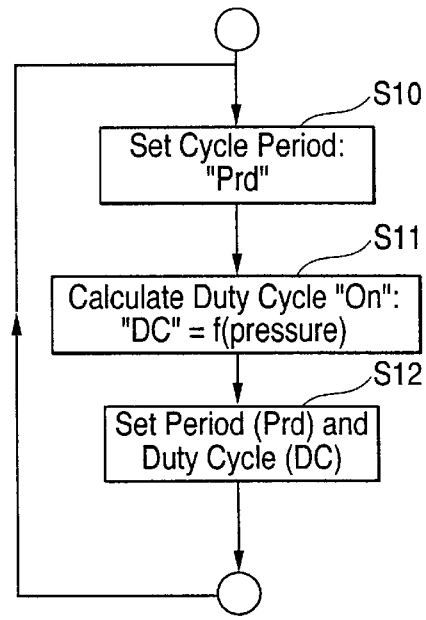
FIG. 13 is a flow chart illustrating another embodiment of the solenoid valve control logic.

FIGS. 12–14 show the control logic that can be used to modulate the solenoid valve 120. The embodiment of FIG. 12 uses a pressure sensor 130, as shown in the embodiments of FIGS. 2, 4, and 6. The pressure sensor 130 detects the refrigerant pressure upstream of the motor 110. Using the computer or logic controller 200, the detected pressure is compared with a predetermined upper limit1 (S1). If the detected pressure is greater than the predetermined upper limit1, the solenoid valve 120 is closed (S2). If the detected pressure is less than the upper limit1, it is compared with a predetermined lower limit2 (S3). If the detected pressure is less than the predetermined lower limit2, the solenoid valve 120 is opened (S4). The predetermined limits, limit1 and limit2, control the period and duty cycle of the valve opening and closing function. When these values are made close to each other, rapid cycling is possible. The pressure limit1 and limit 2 can be, for example, set to 42 psig and 24 psig. With these limits, the refrigerant pressure inside the motor can be maintained within about 40 psig. These pressures correlate to the appropriate evaporator temperatures for a refrigerant, such as R134a.

In the embodiment of FIG. 13, the Cycle Period (PRD) is set to a fixed value (S10). The ON Duty Cycle (DC) is calculated as a function of the detected pressure based on a predetermined look-up table/curve (S11). The DC and PRD values are then set (S12). The action of the low-pressure drop solenoid valve 120 delivers refrigerant at a high pressure to the motor. If the valve 120 is left open too long, the refrigerant (liquid or highly liquid) will flood through the motor and create a relatively high pressure at the outlet of the motor/expander. When this occurs, the motor/expander will no longer have a large pressure drop across it, and thus will fail to recover energy from the high cavitation region (as the refrigerant will behave hydraulically). Thus, modulating the refrigerant flow in pulses can ensure that a large pressure differential and near optimum power recovery can be sustained. The period of the pulse can be set to a fixed value (FIG. 13) or made variable (FIG. 14). The percentage of the pulse during which the solenoid valve is open is the duty cycle. The values of these parameters can depend on the desired "smoothness" of the refrigerant flow and the ability to keep the evaporator at the desired pressure/temperature level.

In the embodiment of FIG. 14, the Superheat temperature (SH) is calculated as an Evaporation Temperature detected from the temperature sensor 160 minus the Saturation Temperature, which is obtained from a predetermined look up table/curve stored in a memory in the controller 200 based on the detected pressure (S100). The Cycle Period (PRD) is determined from a predetermined look-up table/ curve stored in a memory based on the calculated SH (S101). The duty cycle adjustment (Adj) is obtained from a predetermined look-up table/curve stored in a memory based on the calculated SH (S102). The ON Duty Cycle (DC) is calculated as a function of the detected pressure plus the Adj (S103). Using the detected pressure, the value of DC can be obtained from a predetermined look-up table/curve stored in a memory. The PRD and DC values are then set (S104).

Figure 8:
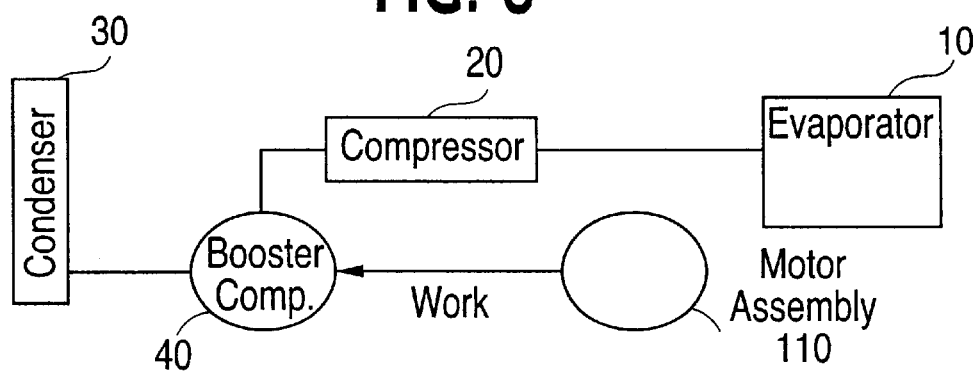
FIG. 8 schematically shows one embodiment in which the energy recovery device according to the present invention can be applied to enhance efficiency.
Figure 9:
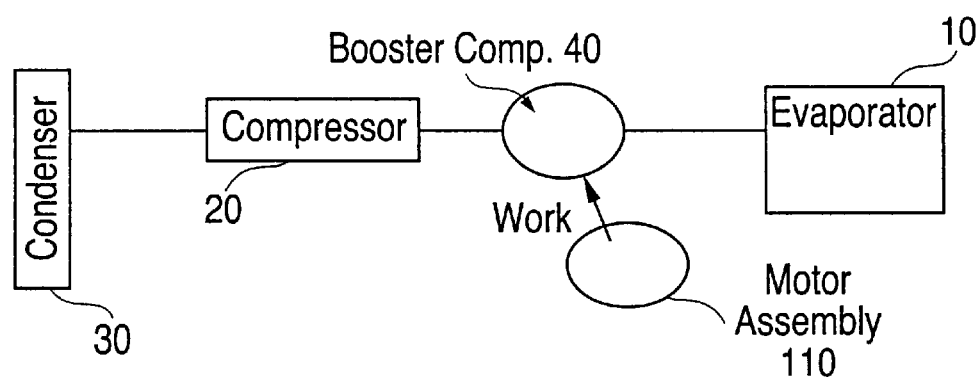
FIG. 9 schematically shows another embodiment in which the energy recovery device according to the present invention can be applied to enhance efficiency.
Figure 10:
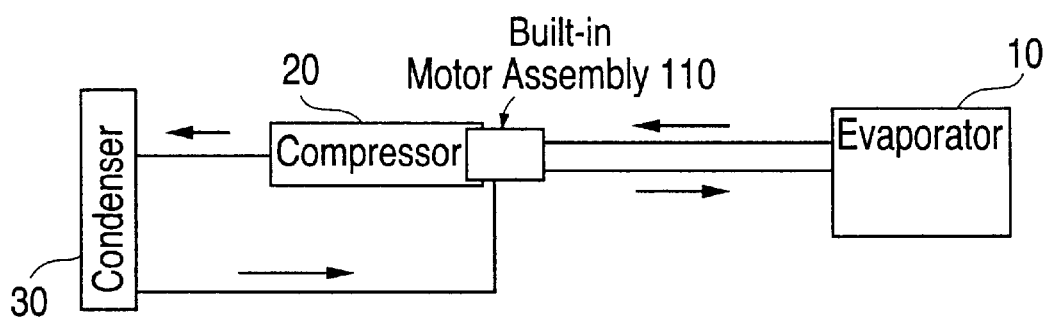
FIG. 10 schematically shows another embodiment in which the energy recovery device according to the present invention can be applied to enhance efficiency.
Figure 11:
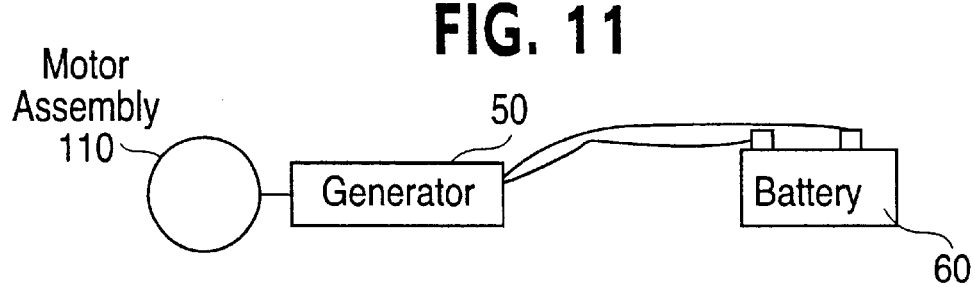
FIG. 11 schematically shows another embodiment in which the energy recovery device according to the present invention can be applied to enhance efficiency.

The energy recovery device 100 can be used to power the automobile in many ways. FIGS. 8–11 show some examples of how the recovered energy can be applied to power the automobile. In the embodiment of FIG. 8, the motor 110 can drive a booster compressor 40 positioned upstream of the main compressor 20. In the embodiment of FIG. 9, the motor can drive a booster compressor 40 positioned downstream of the main compressor 20. In the embodiment of FIG. 10, the motor 110 can assist the main compressor 20. For example, the motor 110 can be connected to or built with the main compressor 20 to assist the main compressor 20. In the embodiment of FIG. 11, the motor can drive a generator 50, which can recharge the automobile battery or an auxiliary battery 60, or a cooling fan. Another example includes using the generator 50 to operate an electric condenser or cooling fan (not shown).

Potential compression power recovery of 15%–40% is believed to be possible while maintaining an effective "refrigerant effect." Higher percentages of compressor work can be recovered in less severe thermal loads. A conservative estimate of power recovery is believed to be around 300 Watts. Idling an experimental vehicle in a 20° C. ambient provided enough power to operate one 150 Watt cooling fan at a medium speed without a solenoid flow control and a less than ideal motor. The present inventor has discovered that reducing refrigerant charge enhances the percentage of recovered energy. Moreover, the effective condensing performance that this energy extraction represents also improves by reducing the refrigerant charge.

Figure 15:
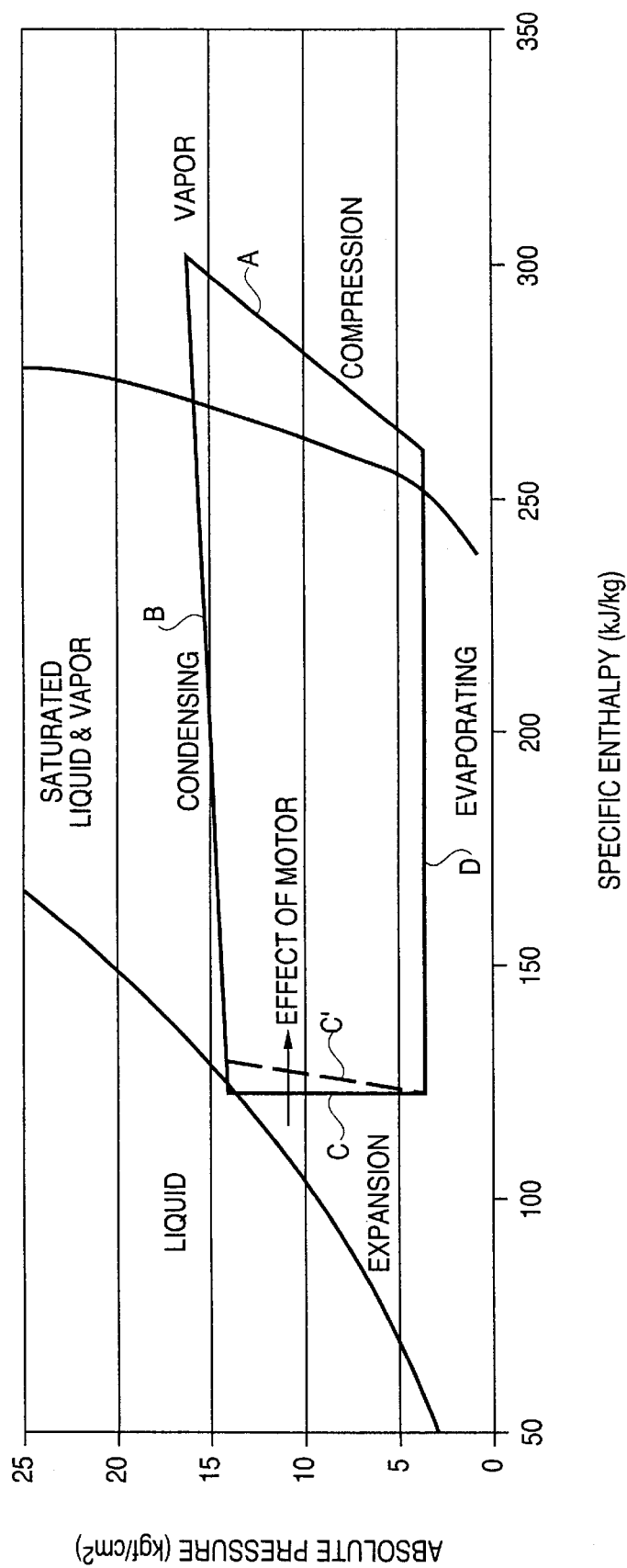
FIG. 15 is a graph illustrating a typical refrigerant charge.
Figure 16:
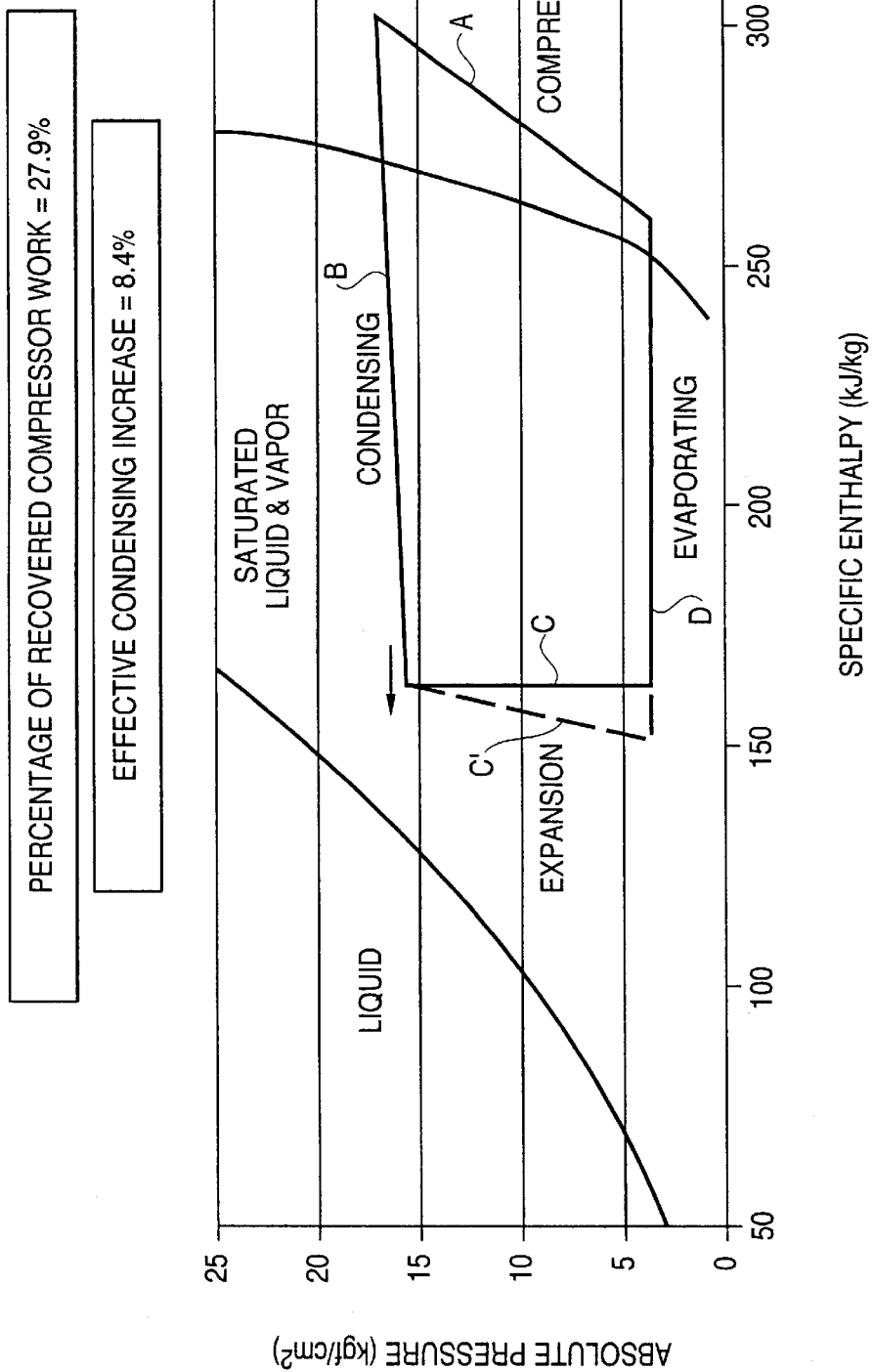
FIG. 16 is a graph illustrating a reduced refrigerant charge.
Figure 17:
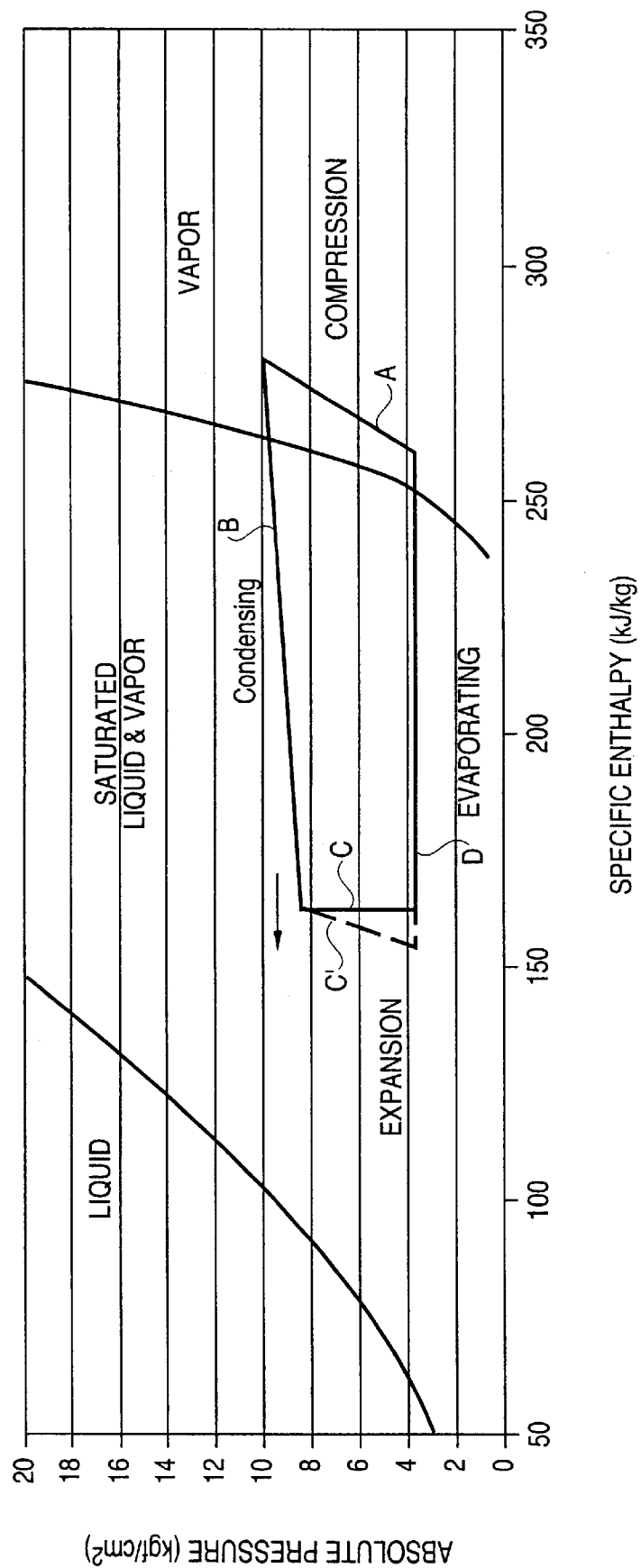
FIG. 17 is a graph illustrating the reduced refrigerant charge of FIG. 16 at different environmental conditions.

FIGS. 15–17 illustrate graphs of a refrigeration cycle chart for a R134a refrigerant. FIG. 15 shows how the same or substantially the same refrigerant energy (enthalpy) content is applied at the entrance of the evaporator using a conventional system with an expander. The required heat rejection by the condenser is less in the case of using the expander, which means that a smaller condenser can be used. FIGS. 16 and 17 basically assume a given condenser size and depict how the expander can improve the "refrigeration effect" in the evaporator 10 by reducing the entrance enthalpy.

The refrigeration cycle includes the compression phase A, condensing phase B, expansion phase C, and evaporation phase D. In the compression phase A, the compressor 20 compresses the vapor phase (gaseous) refrigerant to a hot high-pressure gaseous refrigerant. In the condensing phase B, the hot high-pressure refrigerant enters the condenser 30, which is typically a coil, and cools and condenses the refrigerant. The amount of liquid formation depends on the refrigerant content in the system and amount of cooling. If sufficient heat transfer and refrigerant content charge are applied, the refrigerant will form liquid at the exit of the condenser 30. In the expansion phase C, the refrigerant, which is under high pressure, is passed through the energy recovery device 100, resulting in work output and cold, low-pressure saturated liquid-vapor-phase refrigerant. In the evaporation phase D, the resulting cold, low-pressure saturated liquid-vapor-phase refrigerant runs through the evaporator 10, which is typically a coil, to cool air fed to the passenger compartment.

According to the present invention, the condenser 30 need not condense the hot vapor-phase refrigerant into a liquid-phase refrigerant (FIG. 15), as the present invention can take advantage of expanding the refrigerant in a saturated liquid-vapor phase (FIGS. 16 and 17). Indeed, the refrigerant can be deliberately reduced, e.g., by ¼, ½, etc., so that the condensed refrigerant is stopped short of forming the liquid phase, as shown in FIGS. 16 and 17. The reason for this is that the energy recovery device 100, during the energy recovery phase, further extracts heat from the refrigerant.

If merely an orifice 140 or an expansion valve is used as the interface between the condenser 30 and the evaporator 10, the action of passing the high pressure refrigerant through the orifice to the low pressure refrigerant at the evaporator 10 (theoretically) does not change the energy content (enthalpy) of the refrigerant. On the other hand, if the power recovery device 100 is applied between the condenser 30 and the evaporator 10, the internal energy of the refrigerant will decrease (see the dashed line C' in FIGS. 15, 16, and 17).

As shown in FIG. 15, the power recovery device 100 can achieve substantially the same minimum energy content that enters the evaporator 10, with less condensing performance. That is, the condensing phase need not expend as much energy in condensing the refrigerant to the liquid phase to achieve the same "refrigerant effect." This is achieved by reducing the refrigerant charge. When less refrigerant charge content is used, more vapor mass actively participates in the power recovery process, thus increasing the efficiency. See FIGS. 16 and 17.

Specifically, the most dramatic mechanical action that allows for power recovery comes from the change of phase from liquid to vapor. The same mass of vapor refrigerant (R134a) can occupy a volume of around 70 times that of liquid. The refrigerant that exits the condenser invariably will contain some liquid that will not change phase as it passes onto the evaporator. This mass does actively participate in the power recovery process, given the virtually incompressible nature of liquids. Lower refrigerant charge content decreases the refrigerant's liquid content after expansion. Thus, more mass is available for participation in the power recovery process.

With a reduced refrigerant charge, vapor and liquid pass from the condenser. The vapor, which exists at a high pressure in the condenser, occupies a smaller volume than at a lower pressure. Power recovery is possible due to the expanding vapor. An extreme example of this "vapor effect" can be achieved by omitting the condenser. Nearly all of the compression energy from the vapor can be recovered. In this extreme case, there would be very little or no refrigerant effect, but achieve very efficient power recovery. Thus, the balance of achieving the refrigerant effect and power recovery can be controlled with refrigerant charge content.

FIG. 17 is substantially similar to FIG. 16, but at lower ambient temperatures and heat load conditions. FIG. 17 shows that at the lower ambient temperatures and heat load conditions, the efficiency of the power recovery increases. Constant entropy expansion was assumed for the charts of FIGS. 15–17 to evaluate potential power recovery.

Given the disclosure of the present invention, one versed in the art would appreciate that there may be other embodiments and modifications within the scope and spirit of the present invention. Accordingly, all modifications attainable by one versed in the art from the present disclosure within the scope and spirit of the present invention are to be included as further embodiments of the present invention.

The scope of the present invention accordingly is to be defined as set forth in the appended claims.

I claim:

1. An air conditioner comprising:
an evaporator that evaporates a cold refrigerant to a vapor phase;
a main compressor connected to the evaporator so that the compressor receives the vapor-phase refrigerant from the evaporator and compresses the vapor-phase refrigerant;
a condenser connected to the compressor so that the condenser receives the compressed refrigerant from the compressor and condenses the refrigerant; and
an energy recovery device connected to the condenser and the evaporator so that the compressed and condensed refrigerant is passed through the energy recovery device,
wherein the energy recovery device includes:
a motor located downstream of the condenser and upstream of the evaporator; and
a regulator that passes the compressed and condensed refrigerant into the motor and maintains the refrigerant in a high cavitation region, while maintaining within a predetermined refrigerant pressure range in the motor,
wherein the regulator releases the refrigerant to the evaporator in a first saturated liquid-vapor phase having a higher vapor content than the refrigerant exiting the condenser.

2. An air conditioner according to claim 1, wherein the regulator comprises:
a valve located adjacent the motor, the valve opening and closing flow of refrigerant through the motor; and
a controller for opening and closing the valve based on the pressure of the refrigerant downstream of the motor and upstream of the evaporator to regulate the refrigerant flowing into the motor and maintain the refrigerant in a high cavitation region within the motor, while maintaining within the predetermined refrigerant pressure range in the motor.

3. An air conditioner according to claim 1, wherein the controller includes a pressure sensor located downstream of the motor and upstream of the evaporator.

4. An air conditioner according to claim 3, wherein the valve is a solenoid valve located immediately upstream of the motor, the valve passing the condensed and compressed refrigerant when the valve is opened.

5. An air conditioner according to claim 3, wherein the valve is a solenoid valve located immediately downstream of the motor to limit the flow of the refrigerant, and the energy recovery device further includes an orifice immediately upstream of the motor to restrict the flow of the condensed and compressed refrigerant.

6. An air conditioner according to claim 3, wherein the controller further includes a temperature sensor located immediately downstream of the evaporator.

7. An air conditioner according to claim 2, wherein the controller includes a pressure switch and a power relay to open and close the valve.

8. An air conditioner according to claim 7, wherein the valve is a solenoid valve located immediately upstream of the motor, the valve passing the condensed and compressed refrigerant when the valve is opened.

9. An air conditioner according to claim 7, wherein the valve is a solenoid valve located immediately downstream of the motor to limit the flow of the refrigerant, and the energy recovery device further includes an orifice immediately upstream of the motor to limit the flow of refrigerant when the solenoid valve is open.

10. An air conditioner according to claim 1, wherein the energy recovery device further includes a booster compressor positioned upstream or downstream of the main compressor, the booster compressor being adapted to be driven by the motor.

11. An air conditioner according to claim 1, wherein the motor is integrally built with the main compressor, the motor being adapted to assist driving the main compressor.

12. An air conditioner according to claim 1, wherein the energy recovery device further includes a generator for charging a battery or driving a cooling fan.

13. An air conditioner according to claim 1, wherein the motor is adapted to drive a cooling fan.

14. An air conditioner according to claim 2, wherein the predetermined pressure range is under about 40 psig.

15. An air conditioner according to claim 14, wherein the controller includes a pressure sensor located downstream of the motor and the controller closes the valve when the detected pressure reaches more than 42 psig and opens the valve when the detected pressure reaches less than 24 psig.

16. An air conditioner according to claim 1, wherein the condenser condenses the refrigerant to a liquid phase.

17. An air conditioner according to claim 1, wherein the condenser condenses the refrigerant to a second saturated liquid-vapor phase, which has a higher liquid content than the first saturated-liquid-vapor phase.

18. An air conditioner according to claim 17, wherein the refrigerant is condensed to the second saturated liquid and vapor phase by reducing the refrigerant charge content.

19. A method of recovering energy from an air conditioner having an evaporator that evaporates a cold expanded refrigerant to a vapor phase, a main compressor connected to the evaporator so that the compressor receives the evaporated refrigerant from the evaporator and compresses the refrigerant, a condenser connected to the compressor so that the condenser receives the compressed refrigerant from the compressor and condenses the compressed refrigerant, the method comprising:
providing an energy recovery device, the energy recovery device including a motor;
passing the condensed refrigerant through the motor; and
regulating the flow of the refrigerant through the motor and maintaining the refrigerant in a high cavitation region within the motor, while maintaining within a predetermined refrigerant pressure range in the motor, to expand the refrigerant to a first saturated liquid-vapor phase having a higher vapor content than the refrigerant exiting the condenser.

20. A method according to claim 19, wherein the energy recovery device further includes a valve located adjacent the motor, the valve opening and closing flow of the refrigerant through the motor, wherein regulating the flow comprises:
detecting the pressure of the refrigerant downstream of the motor;
opening and closing the valve based on the detected pressure of the refrigerant downstream of the motor to maintain the refrigerant in the motor in the high cavitation region and to maintain within the predetermined refrigerant pressure range in the motor; and
expanding the refrigerant to the first saturated liquid-vapor phase in the motor before introducing the refrigerant to the evaporator.

21. A method according to claim 20, wherein the predetermined pressure range in the motor is less than about 40 psig.

22. A method according to claim 21, wherein the valve is closed when the detected pressure reaches more than 42 psig and opened when the detected pressure reaches less than 24 psig.

23. A method according to claim 20, further comprising condensing the refrigerant to a liquid phase before expanding the refrigerant.

24. A method according to claim 20, further comprising condensing the refrigerant to a second saturated liquid-vapor phase having a higher liquid content than the first saturated liquid-vapor phase before expanding the refrigerant.

25. A method according to claim 24, wherein the refrigerant is condensed to the second saturated liquid-vapor phase by reducing the refrigerant charge content.

26. A method of recovering energy from an air conditioner, comprising:

condensing a compressed refrigerant to a saturated liquid-vapor phase instead of a liquid phase;

passing the saturated liquid and vapor-phase refrigerant through an energy recovery device, which includes a motor; and regulating the flow of the refrigerant through the motor and maintaining the refrigerant in a high cavitation region, while maintaining within a predetermined refrigerant pressure range in the motor, to expand, in the motor, the saturated liquid-vapor-phase refrigerant to a saturated liquid-vapor-phase refrigerant having a higher vapor content than the condensed saturated liquid-vapor-phase refrigerant.

27. A method according to claim 26, wherein the energy recovery device further includes a valve located adjacent the motor, the valve opening and closing flow of refrigerant through the motor, wherein flowing the condensed saturated liquid-vapor-phase refrigerant through an energy recovery device comprises:

detecting the pressure of the refrigerant downstream of the motor;

opening and closing the valve based on the detected pressure of the refrigerant downstream of the motor to maintain the refrigerant flowing into the motor in a high cavitation region and to maintain within a predetermined refrigerant pressure range in the motor; and expanding, in the motor, the condensed saturated liquid-vapor-phase refrigerant to the higher-vapor-content saturated liquid-vapor-phase refrigerant.

* * * * *

UNITED STATES PATENT AND TRADEMARK OFFICE
CERTIFICATE OF CORRECTION

Figure 5:
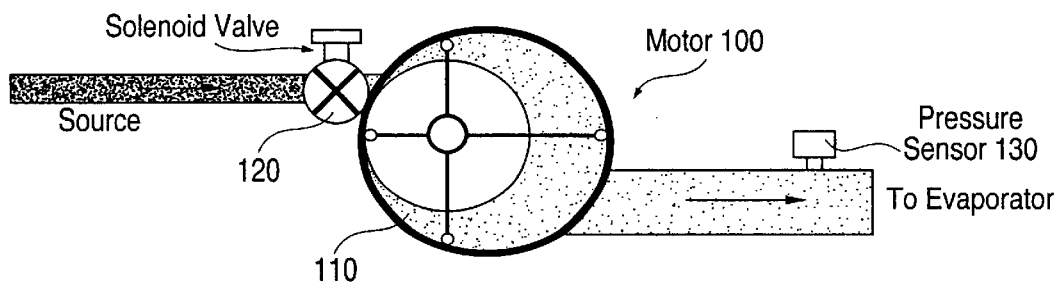
FIG. 5 schematically shows the energy recovery device of FIGS. 2–4, while its solenoid valve is in the closed state.

PATENT NO.   : 6,272,871 B1
DATED        : August 14, 2001
INVENTOR(S)  : Ronald S. Eisenhour It is certified that error appears in the above-identified patent and that said Letters Patent is hereby corrected as shown below:

<u>Drawings,</u>
Sheet 4 of 8, Figure 5, delete "Motor"

Signed and Sealed this

Tenth Day of June, 2003

JAMES E. ROGAN
*Director of the United States Patent and Trademark Office*